United States Patent

Becker et al.

[15] 3,665,483

[45] May 23, 1972

[54] LASER RECORDING MEDIUM

[72] Inventors: Carl H. Becker; Harold R. Dell, both of Palo Alto; Keith E. McFarland, Woodside; Herman Wong, Santa Clara, all of Calif.

[73] Assignee: Chase Manhattan Capital Corporation, New York, N.Y.

[22] Filed: June 6, 1969

[21] Appl. No.: 831,172

[52] U.S. Cl. ....................................346/1, 117/8, 346/76 L, 346/135

[51] Int. Cl. ....................................................G01d 15/34

[58] Field of Search ................346/76 L, 76 R, 135, 1; 117/8, 117/211, 227

[56] References Cited

UNITED STATES PATENTS

| | | | |
|---|---|---|---|
| 2,003,680 | 6/1935 | De Forest | 178/5 |
| 2,726,179 | 12/1955 | Ortlieb et al. | 117/227 |
| 3,181,170 | 4/1965 | Akin | 346/108 |
| 3,314,073 | 4/1967 | Becker | 346/76 |
| 3,465,352 | 9/1969 | Carlson et al. | 346/76 |
| 3,474,457 | 10/1969 | Becker | 346/76 |
| 2,707,162 | 4/1955 | Fries | 346/135 X |
| 3,303,341 | 2/1967 | Fram et al. | 346/135 X |
| 3,364,493 | 1/1968 | Myer | 346/135 X |
| 3,560,994 | 2/1971 | Wolff et al. | 346/135 X |

*Primary Examiner*—Joseph W. Hartary
*Attorney*—Townsend and Townsend

[57] ABSTRACT

A recording medium for permanent storage of data by selective laser beam ablation of a layer of energy-absorbing material. The recording medium is formed by a substrate, a uniform layer of light energy-absorbing material coated on the substrate, and a protective layer of transparent material coated over the layer of energy-absorbing material. The protective layer and substrate seal the respective sides of the layer of energy-absorbing material.

13 Claims, 8 Drawing Figures

INVENTORS
CARL H. BECKER
HAROLD R. DELL
KEITH E. McFARLAND
HERMAN WONG
BY
Townsend and Townsend
ATTORNEYS

LASER RECORDING MEDIUM

This invention relates to a new and improved laser data recording medium.

Data storage systems have been developed in which data is permanently stored by selective ablation of an energy-absorbing material by an intensity modulated laser beam. The recording medium generally consists of a layer of energy-absorbing material formed on a transparent carrier or substrate. An optical recording head focuses the modulated laser beam to a diffraction limited size on the energy-absorbing material as the recording head and recording medium translate relative to each other. Examples of such recording systems are set forth in U. S. Pat. Nos. 3,314,073 and 3,314,075. A disadvantage of the recording medium utilized in such systems is the vulnerability of the information storage layer to wear and abrasion during handling. Because of the extremely high information density ablated in the information storage layer, abrasion or destruction of the energy-absorbing material cannot be tolerated. Furthermore, it is often advantageous to utilize for the energy absorbing material a metal which undergoes chemical change in the presence of the atmosphere, thereby adding further to deterioriation of the energy-absorbing layer. Another disadvantage heretofore encountered in the use of such recording media in high density laser recording systems results from the necessarily close spacing between the optical recording head and the energy-absorbing layer. Vaporized or ablated portions of the energy-absorbing material tend to be deposited on the lens of the optical recording head building up a layer in time sufficient to impair the effectiveness of the laser. A further disadvantage of recording media heretofore used is that the transparent carrier substrate tends to be destructively affected during ablation of the energy-absorbing layer under certain conditions.

It is therefore an object of the present invention to provide a reliable laser recording medium with a high resistance to wear thereby permitting freedom in handling.

Another object of the invention is to provide a laser recording medium and recording method which eliminates deposition of the ablated or vaporized energy-absorbing material from the recording medium on the lens of the optical recording head.

A further object of the invention is to provide a laser recording medium in which the energy-absorbing material is isolated from the atmosphere in a sealed environment so that non-inert substances can be used for the energy-absorbing material.

Another object of the invention is to provide a laser recording medium which provides heat protection for the transparent carrier or substrate in order to prevent destructive burning of the substrate during recording.

In order to accomplish these results, the present invention in its basic aspect contemplates providing a laser recording medium formed of a flat substrate on which a uniform layer of optical energy-absorbing material is coated. Over the energy-absorbing material, an additional protective layer of transparent material is coated so that the layer of energy-absorbing material is sealed intermediate the substrate and the protective layer.

According to another aspect of the invention, a heat reflective layer is formed intermediate the transparent substrate and the layer of energy-absorbing material in order to eliminate destructive heat dissipation in the substrate.

The invention also contemplates providing multi-layered recording media such as, for example, a flat substrate carrier having a layer of energy-absorbing material formed uniformly on either side of the carrier. A transparent protective layer is formed over each of the energy-absorbing layers. Data can then be recorded on either side of the carrier by laser beam ablation of the respective layers of energy-absorbing material. In another embodiment of the invention a multi-layered recording medium is provided wherein recording by laser beam ablation occurs through a transparent substrate on one side of the recording medium to one of the two spaced-apart energy-absorbing layers, depending upon the point of focus of the laser beam.

According to the preferred embodiment of the invention, the energy-absorbing information storage layer is a metal layer formed by sputtering onto a transparent carrier or substrate. The transparent protective layer is also formed by sputtering over the metal layer, but adhesive bonding can be used.

Other objects, features, and advantages of the present invention will become apparent in the following specification and accompanying claims.

Figure 1:
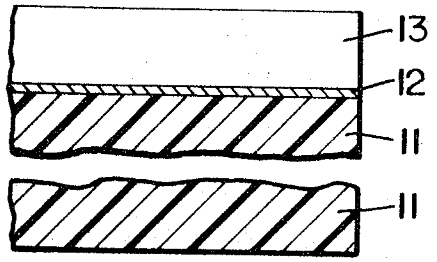
FIG. 1 is a fragmentary side cross-section view of a laser recording medium embodying the present invention.

In the recording medium illustrated in FIG. 1 there is provided a flexible transparent substrate 11 made of a plastic such as Mylar or Celanar. The substrate or carrier 11 is of sufficient thickness to provide the required supporting strength and may be, for example 1.5 to 10 mils thick. Formed on the substrate 11 is a thin layer of energy-absorbing material which may be, for example, a metal such as rhodium. The metal layer 12 is formed uniformly across the surface of the substrate 11 by, for example, vaporization, sputtering or other vacuum deposition. Sputtering has been found to provide superior metal to substrate bonding, and uniformity of the metal layer. The surface of the substrate is precleaned by chemical techniques, for example, utilizing Freon as the cleaning fluid. The surface of the substrate on which the metal is to be deposited can also be cleaned by vacuum techniques. An advantage of the sputtering technique of vacuum deposition is that the substrate surface or other surface on which deposition is to take place is cleaned by bombardment during the coating process.

Coated over the metal layer 12 is a protective layer 13 of transparent material provided to protect the metal layer from abrasion. The transparent material forming the protective layer 13 may be, for example, $SiO_2$ which is deposited on the metal layer by sputtering or other vacuum deposition. In order to provide scratch protection only, the $SiO_2$ layer can be a fraction of the wavelength of the laser radiation with which the recording medium is to be used, such as, for example, $\lambda/4$ or $\lambda/2$, where $\lambda$ is the characteristic laser wavelength. If the protective layer 13 is sufficiently thick it also displaces dust and dirt from the focal plane of the laser beam. In addition, the protective coating can provide an antireflective layer over the metal layer having a thickness of $n(\lambda/4)$, where $n$ is an integer. A thickness of, for example, $n(\lambda/4)$ wavelengths provides an antireflective layer and, in addition, displaces dirt and dust out of focus with respect to the metal layer at which recording by laser beam ablation occurs. Another example of a transparent material which may be used for the protective layer, is $Al_2O_3$. In the recording medium shown in FIG. 1, recording by laser beam ablation takes place through the transparent protective layer 13.

Figure 2:
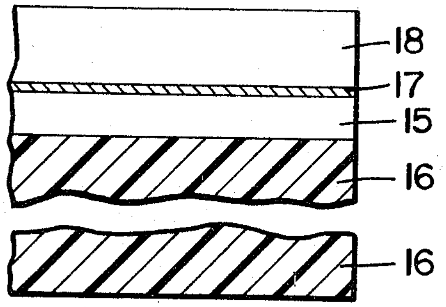
FIG. 2 is a laser recording medium including a heat reflective layer.

In the recording medium illustrated in FIG. 2, a heat reflective layer 15 is interposed between the transparent substrate 16 and metal layer 17. The heat reflective layer 15 is of a transparent material having a thickness of approximately $\lambda_t/4$ or $\lambda_t/2$, where $\lambda_t$ is the characteristic heat wavelength induced from the laser beam. The heat reflective layer 15 consists, for example, of $SiO_2$ sputtered onto the substrate 16. The metal layer 17 is thereafter sputtered onto the $SiO_2$ layer 15. The substrate 16 is formed of a plastic such as Mylar or Celanar as heretofore described. The metal layer consists of a uniform deposit of a metal such as, for example, aluminum, platinum or rhodium. A protective layer 18 is coated over metal layer 17 as heretofore described to a thickness of $n(\lambda/4)$ where n is an integer formed of a transparent material such as $Al_2O_3$.

Recording by laser beam vaporization of the metal layer takes place through the transparent protective layer 18, while the half-wave heat reflective layer 15 provides protection for the substrate 16.

A heat reflective layer 15 formed of fused quartz or $SiO_2$ also provides improved bonding of the metal layer and the substrate. Because the layer 15 of fused quartz or $SiO_2$ imparts structural properties to one side of the substrate 16, it is advantageous to include a layer similar to layer 15 on the opposite side of substrate 16 in order to impart structural symmetry to the recording medium.

Figure 3:
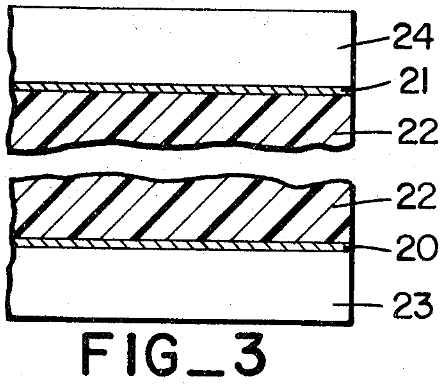
FIG. 3 is a laser recording medium having two energy-absorbing layers.

A recording medium similar to that illustrated in FIG. 1 but provided with double recording layers is illustrated in FIG. 3. According to this embodiment, metal layers 20 and 21 are deposited on either surface of a transparent substrate 22 as by sputtering or other vacuum deposition. Transparent protective layers 23 and 24 are thereafter coated, respectively, over metal layers 20 and 21 in the manner heretofore described. Data recording by laser beam ablation of either metal layer 20 or 21 is accomplished through either of the transparent protective layers 23 or 24, respectively, with the laser beam focused on the appropriate metal layer.

In each of the embodiments described above, the optical energy-absorbing layer is sealed on each side by other layers of transparent material. Because the energy-absorbing layer is sealed from the atmosphere, non-inert substances can be used for this recording layer. For example, aluminum, which tends to undergo chemical change in the presence of the atmosphere, is preserved without deterioration for indefinite periods of time. The transparent enclosing layers also provide protection from abrasion and scratching during handling, and displace dust and other particles from the focal plane of the laser beam. In addition to the metals mentioned above, other materials which may be used for the energy-absorbing layer are described in U.S. Pat. No. 3,314,073, assigned to the assignee of the present case.

In using metals for the energy absorbing material, the desirable parameters for the metal and the energy-absorbing layer are described in U.S. Pat. application, Ser. No. 682,478, entitled, LASER RECORDING METHOD AND APPARATUS, Carl H. Becker, inventor, filed on Nov. 13, 1967, and assigned to the assignee of the present case, now U.S. Pat. No. 3,474,457.

According to that disclosure, metal layers formed sufficiently thin to afford in the order of 10 percent transmissivity at the characteristic frequency of the laser beam with which they are to be used is desirable. An additional factor requiring such thin metal layers arises in the present invention because of the complete enclosure of the metal layer by adjacent coatings which seal the metal layer from the atmosphere. Thus, according to the present invention, the vaporization or ablation of a bit in the metal layer produces an internal explosion within the recording medium without significant destructive effective to the adjacent substrate and protective layer. Thus, the ablation of a bit in the metal layer is analogous to an underground explosion with displacement outward of the ablated or vaporized metal to form a densely packed ring around the hole so formed. The metal layer must therefore be formed sufficiently thin to permit molecular or atomic displacement to the perimeter of the ablated hole or bit without significant change in volume. The effect on the adjacent substrate and protective layer is therefore negligible. For example, a 200 A thickness layer of rhodium, approximately one optical thickness of that metal, has been found satisfactory. Because there is no release of vaporized metal or other energy-absorbing material in the atmosphere adjacent the optical recording head, there is no accumulating deposition on the recording head lens adjacent the recording medium, a problem which has been encountered with recording media heretofore used.

In the embodiments of the recording medium invention described above, the substrate need not be transparent, but can also be opaque. The laser energy, recording speed and recording frequency are adjusted to produce ablation of the energy-absorbing information storage layer, without destructive energy dissipation in the substrate. Appropriate control of recording parameters is described in U.S. Pat. application Ser. No. 682,478 referred to above. In another embodiment the substrate is formed with a reflective layer over which the energy-absorbing layer for laser beam ablation is formed. Because the information storage energy-absorbing layer is preferably formed with a certain amount of transmissivity, laser radiation is reflected back through the energy-absorbing layer increasing the speed and efficiency of ablation or vaporization. Furthermore, the terms "transparent," "opaque," and "transmissive" are used herein with reference to the operating wavelength of the laser light source with which the recording medium is to be used.

Figure 4:
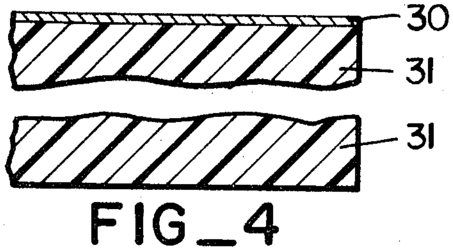
FIGS. 4–6 are fragmentary side cross-section views of various stages in the preparation of another laser recording medium.
Figure 5:
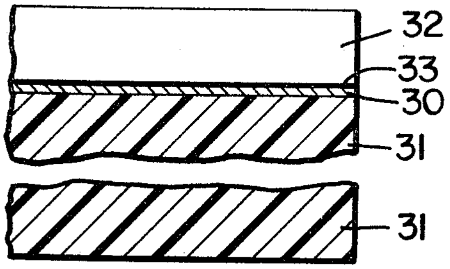
Figure 6:
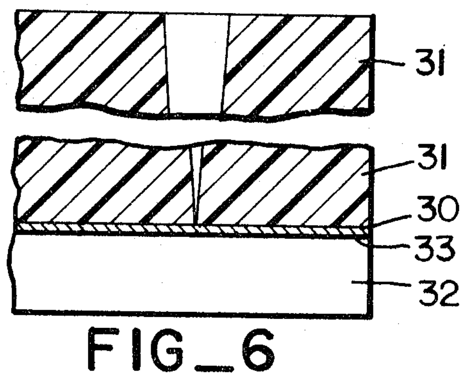

FIGS. 4–6 illustrate stages in the preparation of another recording medium embodying the present invention. In FIG. 4 there is shown a metal layer 30 deposited on a transparent substrate 31 by sputtering or similar vacuum deposition. As shown in FIG. 5, a protective layer 32 of transparent material is laminated over the metal layer 30 by means of an adhesive bonding 33. The recording medium so formed is thereafter inverted as shown in FIG. 6 for data recording by ablation of the metal layer 30 through substrate 31 instead of through the transparent protective layer 32. Lamination of the protective layer over the metal layer by adhesive bonding can more easily and readily be accomplished while still permitting recording by laser beam ablation of the metal layer 30 at the uniform interface between the metal and substrate provided by sputtering. Alternatively, the metal 30 can be sputtered onto the protective layer 32 with the substrate or carrier 31 thereafter laminated to the metal layer by adhesive bonding.

Figure 7:
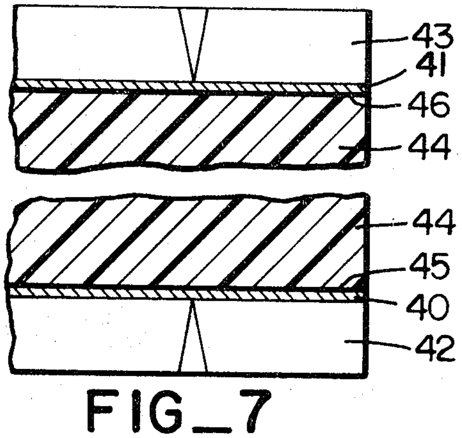
FIGS. 7 and 8 are fragmentary side cross-section views of two laser recording media having double energy-absorbing information storage layers.
Figure 8:
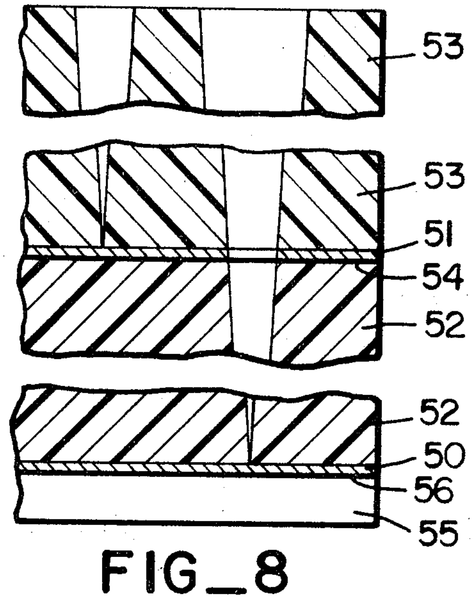

Recording media similar to that shown in FIGS. 4–6 but provided with double recording layers are illustrated in FIGS. 7 and 8. As shown in FIG. 7, energy-absorbing layers 40 and 41 are coated directly on transparent protective layers 42 and 43, respectively, by vacuum deposition such as sputtering.

The metal coated transparent layers are thereafter adhesively laminated to opposite sides of a transparent substrate 44 by means of adhesive bonding layers 45 and 46. Data recording in the energy-absorbing layers 40 and 41 is accomplished through the transparent layers 42 and 43, respectively, the laser beam thereby being focused to impinge on the uniform interface between the metal layer and transparent protective layer provided by, for example, sputtering.

A recording medium having two recording layers on which data recording is accomplished through the same side of the recording medium is illustrated in FIG. 8. As shown in this form of the invention, energy-absorbing layers 50 and 51 are coated, respectively, on substrate 52 and 53, respectively, by means of sputtering. The clean side of substrate 52 is thereafter adhesively bonded to metal layer 51 by means of an adhesive bonding 54. A protective layer of a transparent material is laminated over the metal layer 50 by means of adhesive bonding 56. Data recording on information storage layer 51 is accomplished by adjusting the focal plane of the laser beam to coincide with the information storage layer 51. In the same manner data recording on energy-absorbing layer 50 is accomplished by adjusting the focal plane of the laser beam to coincide with the layer 50.

In the recording medium illustrated in FIG. 7, each of the transparent layers 42, 43 and 44 can be formed of a plastic such as Mylar or Celanar. In the recording medium shown in FIG. 8, the transparent layers 52 and 53 can each be formed of the same material, a plastic such as Mylar or Celanar. The protective layer 55 can be formed of the same material or of fused quartz or $SiO_2$.

In all of the embodiments described above, the energy-absorbing material used for the information storage layer may be a metal such as aluminum, rhodium or platinum, or other metals having the desirable parameters referred to in copending U.S. Pat. application, Ser. No. 682,478, mentioned above. Thus, a rhodium layer having a thickness of approximately 200 A units or an aluminum layer or approximately 164 A is satisfactory, though a variation in thickness is possible without the functional limitations heretofore mentioned and referred to.

The recording media described herein can be formed into a variety of flat configurations such as a tape, a disk, or a strip for wrapping around the periphery of a drum as described in U.S. Pat. application entitled, LASER RECORDING UNIT, invented by Carl H. Becker, Harold R. Dell, Ballard D. French, Masao Hashiguchi, Keith E. McFarland and Herman Wong, executed on Mar. 12, 1969 now U.S. Pat. application Ser. No. 807,553 filed on Mar. 13, 1969.

What is claimed is:

1. A recording medium for permanently storing data by selective laser beam ablation of a layer of energy absorbing material comprising: a flat substrate; a uniform layer of partially light transmissive optical energy-absorbing material coated on said substrate; and a protective layer of transparent material coated over said layer of energy-absorbing material, said protective layer and substrate formed to completely seal each side of said layer of energy-absorbing material before, during, and after selective ablation of the layer of energy-absorbing material with a focused laser beam, said layer formed with a thickness $n(\lambda/4)$ where $\lambda$ is the characteristic operating wavelength of the laser beam and $n$ is an integer selected to displace optical obstructions on the surface of said layer from the focal plane of the laser beam.

2. A laser data recording medium comprising: a substrate; a uniform layer of heat-reflective material coated on said substrate; a uniform layer of partially light transmissive optical energy-absorbing material coated on said heat-reflective layer; and a protective layer of transparent material coated over said energy-absorbing material to completely seal the energy-absorbing layer, said protective layer formed of a material and thickness to maintain the complete seal during and after ablation of the energy-absorbing layer with a focused laser beam, said thickness being $n(\lambda/4)$ where $\lambda$ is the characteristic operating wavelength of the laser beam and $n$ is an integer selected to displace optical obstructions on the surface of said layer from the focal plane of the laser beam.

3. A laser data recording medium as set forth in claim 2 wherein said heat-reflective layer is formed with a thickness of one half the characteristic operating wavelength of the laser with which it is to be used.

4. A laser data recording medium as set forth in claim 2 wherein a layer substantially the same as said heat-reflective layer is coated on the opposite side of said substrate to impart structure symmetry.

5. A laser data recording medium comprising: a flat transparent substrate having a thickness in the range of 1.5 to 10 mils; a thin, partially light transmissive, uniform layer of metal formed thereon; and a protective transparent material coated over said layer of metal to completely seal said layer from the atmosphere before, during and after selective ablation of the layer of metal with a focused beam of coherent light, said protective coating comprising a second flat substrate having a thickness in the range of 1.5 to 10 mils thereby to displace optical obstructions on the surface of said coating from the focal plane of the laser beam.

6. A laser data recording medium comprising: a flat substrate; a thin, partially light transmissive uniform layer of metal sputtered thereon; and a protective layer of transparent material formed completely over said metal layer to seal the metal layer from the atmosphere before, during, and after selective ablation of the metal layer with a focused laser beam.

7. A laser recording medium comprising: a transparent carrier; a thin, partially light transmissive, uniform layer of metal sputtered on said carrier; and a protective layer of transparent material adhesively bonded over said sputtered metal layer and completely covering said layer, said protective layer formed of a material and a thickness to completely, seal the metal layer from the atmosphere before, during and after selective ablation of the metal layer with a focused beam of coherent light.

8. A laser data recording medium comprising: a first transparent carrier having a uniform layer of metal sputtered on one side thereof; a second transparent carrier having a uniform layer of metal sputtered on one side thereof; and means adhesively bonding said first and second carriers with the metal layer of one carrier adjacent the unsputtered side of the other carrier.

9. A laser data recording medium as set forth in claim 8 wherein the exposed metal layer is coated with a transparent protective layer.

10. A laser data recording medium comprising: a first transparent substrate having a layer of metal sputtered on one side thereof; a second transparent substrate having a layer of metal sputtered on one side thereof; and an intermediate carrier adhesively bonded to the respective sputtered metal layers on said first and second substrates.

11. A laser data recording medium comprising: a uniform layer of optical energy-absorbing material having formed on both sides thereof a coating of protective material sealing said layer from the atmosphere, the coating on at least one side thereof being transparent with respect to the operating wavelength of the laser with which the recording medium is to be used, said coatings formed to completely seal the layer of optical energy-absorbing material from the atmosphere and maintain the seal before, during and after selective ablation of the optical energy-absorbing layer with a focused laser beam, said at least one transparent coating comprising a flat substrate having a thickness in the range of 1.5 to 10 mils thereby to displace optical obstructions on the surface of said layer from the focal plane of the laser beam.

12. A laser data recording method comprising: completely enclosing a uniform layer of optical energy-absorbing material between coatings of protective material, the coating on at least one side of said layer being transparent with respect to the operating frequency of a laser with which it is to be used, said coatings formed to completely seal the layer of optical energy-absorbing material from the atmosphere and maintain the seal before, during and after selective ablation of the optical energy-absorbing layer with a focused laser beam; ablating the layer of optical energy-absorbing material by focused laser radiation passed through the transparent coating, thereby displacing said energy-absorbing material laterally outwardly between the coatings of protective material from centers of ablation; adjusting the laser radiation energy, recording speed and recording frequency to minimize destructive energy dissipation in the protective coatings whereby the complete seal formed by said coatings is maintained.

13. A laser data recording medium comprising: a first transparent substrate having a layer of metal formed on one side thereof; a second transparent substrate having a layer of metal formed on one side thereof; and an intermediate carrier bonded to the respective metal layers on said first and second substrates.

* * * * *